United States Patent
Williams

(10) Patent No.: US 8,164,026 B2
(45) Date of Patent: Apr. 24, 2012

(54) LASER DRILLING COMPONENTS

(75) Inventor: Paul E. Williams, Ashby de la Zouch (GB)

(73) Assignee: Rolls-Royce PLC, London (GB)

( * ) Notice: Subject to any disclaimer, the term of this patent is extended or adjusted under 35 U.S.C. 154(b) by 960 days.

(21) Appl. No.: 12/216,495

(22) Filed: Jul. 7, 2008

(65) Prior Publication Data

US 2009/0020512 A1  Jan. 22, 2009

(30) Foreign Application Priority Data

Jul. 17, 2007  (GB) .................................. 0713811.8

(51) Int. Cl.
*B23K 26/38* (2006.01)

(52) U.S. Cl. ..................................... 219/121.7

(58) Field of Classification Search ............ 219/121.63–121.72, 121.84, 121.85
See application file for complete search history.

(56) References Cited

U.S. PATENT DOCUMENTS

| 4,515,867 A | * | 5/1985 | Bleacher et al. ............... 428/204 |
| 4,873,414 A | | 10/1989 | Ma et al. |
| 5,143,533 A | | 9/1992 | Brusasco |
| 5,468,699 A | * | 11/1995 | Zhang et al. ..................... 502/60 |
| 5,634,835 A | * | 6/1997 | Wu et al. ........................ 445/24 |
| 6,139,303 A | * | 10/2000 | Reed et al. ..................... 425/116 |
| 2004/0081760 A1 | * | 4/2004 | Burns et al. ................... 427/269 |

FOREIGN PATENT DOCUMENTS

| EP | 0 347 053 A2 | 12/1989 |
| EP | 1 236 534 A2 | 9/2002 |
| JP | A-2004-42082 | 2/2004 |

* cited by examiner

*Primary Examiner* — Samuel M Heinrich
(74) *Attorney, Agent, or Firm* — Oliff & Berridge, PLC

(57) ABSTRACT

A method of drilling through a wall of a hollow component in which a high energy beam is directed at an outer surface of the wall and emerges into a cavity from an inner surface of the wall, comprising the step of providing in the cavity a medium comprising a ceramic dispersed within a silica sol.

10 Claims, 1 Drawing Sheet

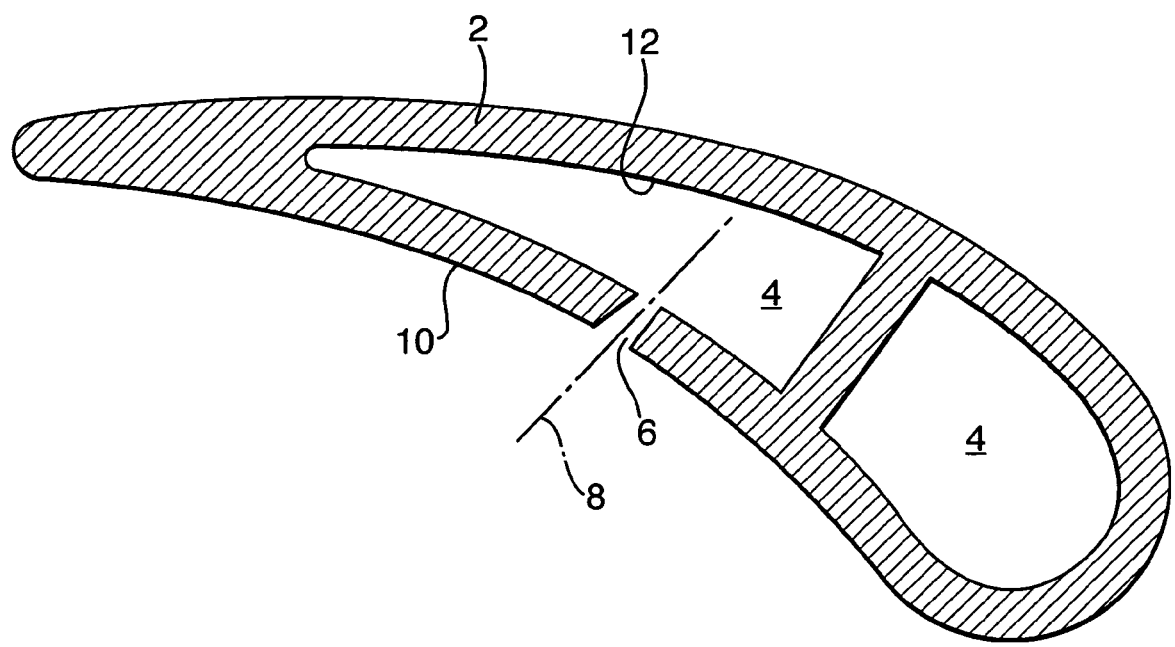

LASER DRILLING COMPONENTS

This invention relates to laser drilling of components, and in particular, although not exclusively, to drilling holes in gas turbine components such as gas turbine blades.

Laser drilling of holes, such as film cooling holes, into internal passages of turbine blades has been known for some time. One problem has been that of preventing the laser beam damaging the far face of the passage opposite to where the beam breaks through. A further problem is that in trying to avoid damage to the far face the beam is controlled but it may fail to fully open the hole which leads to variable mass airflow rates, hole to hole. Another problem has been in preventing material sputtered or vaporised by the beam being deposited onto the inner surfaces of the passage.

Attempts have been made to insert barriers in the passages and attempts have been made to supply liquids, such as waxes, which solidify within the passage. There are difficulties in preventing the wax from solidifying as soon as it contacts the cold wall surrounding the passage. Another difficulty has been in removing the wax and this has involved the use of steam autoclaves.

It is an object of the present invention to seek to provide a method of laser drilling which uses a barrier material which easily fills a passage or cavity to protect a rear wall from damage on breakthrough.

According to a first aspect of the invention there is provided a method of drilling through a wall of a hollow component in which a high energy beam is directed at an outer surface of the wall and emerges into a cavity from an inner surface of the wall, comprising the step of providing a sol-gel in the cavity.

Preferably the method further comprises the step of supplying the sol-gel to the cavity as a liquid or paste. The liquid sol-gel may be thixotropic and the method comprise the step of agitating the component to reduce the viscosity of the sol-gel.

Preferably the method further comprises the step of cooling the sol-gel within the cavity to below its sol-gel transition temperature to gel the sol-gel.

The sol-gel may comprise particulate material dispersed within a silica or alumina sol. Preferably the particulate material is ceramic or glass.

The gel may secure the particulate material in a freeze cast form. The cast particulate material may be sintered by heating.

Preferably the method further comprises the step of removing the cast particulate material by washing or leaching.

Preferably the high energy beam is directed at the outer surface of the wall while cavity contains the sol-gel or freeze-cast ceramic. The high energy beam may be a laser beam.

The component may be a component for a gas turbine engine such as a turbine blade, for example.

Embodiments of the invention will now be described by way of example only, with reference to the accompanying drawings, in which:

FIG. 1 depicts a turbine blade suitable for being drilled using a laser.

Referring to FIG. 1 there is shown schematically a cross-section through the aerofoil of a turbine blade 2 which is to be laser drilled. The blade 2 comprises one or more cooling passages 4 which extend from the root portion through the aerofoil portion.

Small diameter film-cooling holes 6 are formed through laser working and which pass through the wall of the blade into the internal cavities or passages. The laser system may be a pulsed Nd-YAG laser with an optical system that focuses the laser beam 8 onto the surface 10 of the component to be drilled.

To avoid damage to the opposing internal surface 12 of the cavity the cavity is filled with a compound that is resilient to the laser beam.

The compound is based on a sol-gel having a dispersion of particulate material forming a colloidal suspension within a sol. A sol-gel is capable of exhibiting two phases. The first phase approximates a liquid or sol, the second a gelled form. The sol phase has a dispersion of particulate material within a liquid. The gel phase secures the particulate material within a gel network.

The transformation between sol and gel occurs when the compound is cooled to below its gelation temperature the liquid or sol portion of the sol-gel gels or solidifies to secure the dispersed particles.

In the preferred embodiment the sol-gel has ceramic particles forming the colloidal suspension. The sol-gel is preferably based on a silica sol, though other sols e.g. alumina sols etc. may be used. The particulate filler is preferably a fine ceramic powder though other fillers including beads of glass or other materials may be used.

The amount of filler relative to the sol depends on the passage or chamber to be filled. For wider cavities a high percentage of filler may be used which gives a thicker paste like compound. For narrow passages a much lower percentage of filler may be used to give a much less viscous compound allowing the compound to flow with greater freedom into the passage.

Filling may be assisted through the use of a device such as a funnel, syringe or other injection machine. The internal chambers may be evacuated of air before filling to aid the supply of the compound to the chambers or passages.

The ceramic is preferably alumina though other ceramics e.g. silica, zirconia or yttria, calcia, silicon nitride, etc. may be used either alone or in combination with other ceramics within the compound. A wetting agent may be used to aid dispersion of the ceramic particles within the sol, which is mostly water. It is also possible to add further materials such as PTFE, carbon or other appropriate laser beam absorbers or reflectors that further enhance the resilience of the compound to the laser beam.

Because the mixture is thixotropic it is possible to aid filling of the component with the mixture by vibrating the component. The vibration liquefies and agitates the compound to release trapped air. Filling may be further assisted through the use of a device such as a syringe, funnel or other injection device. Gravity, where sufficient static head pressure is present, may also be used to assist filling.

Following filling of the component with the compound the temperature is reduced to below the sol gel transition temperature. Below the transition temperature, the silica precipitates from the sol, forming a gel. The gel holds the filler powder together in approximately an unsintered green form. The form of the filler powder is maintained, even on thawing of the sol.

The component may then be dried in a low temperature furnace to drive off the water and optionally heat treated to sinter the filler powder. However, sintering increases the time and cost to remove the protective core following laser machining of the component.

The sintered or green form filler remains within the component throughout the laser machining operation, which may be drilling, ablation, sublimation, cutting or other method.

Beneficially, and unlike many other techniques, rear wall dross is significantly reduced and may be eliminated.

Following the formation of the holes it is necessary to remove the filler. This is can be achieved using well known leaching methods. These include leaching at equal to or below atmospheric pressure (the pressure controlling the solution boiling at a fixed temperature) with a caustic solution of around 70%, heated to 190-240° C. Alternatively, a conventional autoclave with a 20-40% caustic solution at a pressure of 4-8 bar at 130-170° C. may be used. Finally, an open leaching process, at atmospheric pressure with a mixture of potash and caustic solution may be used, although removal time would be somewhat slower. In the case of using the un-sintered ceramic (in it's green state), the media may be removed by the aforementioned methods or by using hot water at high-pressure. For example, a 3-15 bar water pressure heated up to 240° C., possibly performed in an autoclave. In such case, a short caustic cycle may follow in difficult to clean out geometries.

The invention offers a method and material giving protection from laser breakthrough. The material is cheap and may be easily supplied to, and removed from, an internal passageway. It will be appreciated that the invention finds application in fields outside those of gas turbines e.g. inkjet printer heads, and particularly where it is desirable to protect components upon break through of a laser or other high energy beam.

Within the gas turbine field components other than turbine blades may benefit from the invention. For example, Nozzle Guide Vanes (NGVs), combustors and casings and compressor stages.

The invention claimed is:

1. A method of drilling through a wall of a hollow component in which a high energy beam is directed at an outer surface of the wall and emerges into a cavity from an inner surface of the wall, the method comprising:
   supplying a sol-gel, the sol-gel comprising a particulate material dispersed within a silica or alumina sol, as a liquid or paste; and
   subsequently cooling the sol-gel to below its sol-gel transition temperature to gel the sol-gel.

2. A method according to claim 1, wherein the liquid sol-gel is thixotropic and the method comprises the step of agitating the hollow component to reduce the viscosity of the sol-gel.

3. A method according to claim 1, wherein the particulate material is ceramic or glass.

4. A method according to claim 3, wherein the sol-gel secures the particulate material in a freeze cast form.

5. A method according to claim 4, wherein the method further comprises the step of sintering the freeze cast particulate material by heating.

6. A method according to claim 4, wherein the method further comprises the step of removing the freeze cast particulate material by washing or leaching.

7. A method according to claim 1, wherein the high energy beam is directed at the outer surface of the wall while the cavity contains the gelled sol-gel.

8. A method according to claim 7, wherein the high energy beam is a laser beam.

9. A method according to claim 1, wherein the hollow component is a component for a gas turbine engine.

10. A method according to claim 1, wherein the hollow component is a turbine blade.

* * * * *